(12) United States Patent
Brown et al.

(10) Patent No.: US 12,135,243 B2
(45) Date of Patent: Nov. 5, 2024

(54) FASTENERS FOR SECURITY DEVICES

(71) Applicant: TEXECOM LIMITED, Haslingden (GB)

(72) Inventors: Clym Brown, Wilmslow (GB); Peter Alexander, Todmorden (GB)

(73) Assignee: TEXCOM LIMITED, Haslingden (GB)

( * ) Notice: Subject to any disclaimer, the term of this patent is extended or adjusted under 35 U.S.C. 154(b) by 282 days.

(21) Appl. No.: 17/770,592

(22) PCT Filed: Oct. 21, 2020

(86) PCT No.: PCT/GB2020/052646
§ 371 (c)(1),
(2) Date: Apr. 20, 2022

(87) PCT Pub. No.: WO2021/079111
PCT Pub. Date: Apr. 29, 2021

(65) Prior Publication Data
US 2022/0404206 A1    Dec. 22, 2022

(30) Foreign Application Priority Data

Oct. 23, 2019  (GB) ...................................... 1915330

(51) Int. Cl.
*G01J 5/04* (2006.01)
*G01J 5/00* (2022.01)
(Continued)

(52) U.S. Cl.
CPC .............. *G01J 5/04* (2013.01); *G01J 5/0025* (2013.01); *G01J 5/0265* (2013.01); *G01J 5/0806* (2013.01); *G08B 13/19* (2013.01)

(58) Field of Classification Search
CPC .......... G01J 5/04; G01J 5/0025; G01J 5/0265; G01J 5/0806; G08B 13/19; G08B 13/193;
(Continued)

(56) References Cited

U.S. PATENT DOCUMENTS 4,447,726 A * 5/1984 Mudge ................... G08B 13/19
340/567
4,486,661 A    12/1984 Guscott
(Continued)

FOREIGN PATENT DOCUMENTS

EP    3130898    2/2017
GB    2388489 A    11/2003

OTHER PUBLICATIONS

International Search Report and Written Opinion for PCT/GB2020/052646 dated Apr. 1, 2021; 15 pages.

*Primary Examiner* — Kiho Kim
(74) *Attorney, Agent, or Firm* — Schwabe, Williamson & Wyatt, P.C.

(57) ABSTRACT

A security device, such as a passive infra-red motion detector (1) is provided with a plurality of fasteners (15, 25). One fastener (25) removably fastens a lens (4) to a housing of the passive infra-red detector, such that the lens (4) can be removed from the outside of the housing, whilst the other fastener (15) fastens a front section (2) of the housing to the rear section (3). Both fasteners (15, 25) are transparent/translucent and act as light guides.

17 Claims, 6 Drawing Sheets

(51) Int. Cl.
    *G01J 5/02*         (2022.01)
    *G01J 5/0806*     (2022.01)
    *G08B 13/19*      (2006.01)

(58) Field of Classification Search
    CPC . G08B 13/191; F21V 33/0076; F21Y 2115/10
    See application file for complete search history.

(56) References Cited

U.S. PATENT DOCUMENTS

| | | | |
|---|---|---|---|
| 4,604,524 A * | 8/1986 | Kotlicki | G08B 13/193 |
| | | | 250/353 |
| 8,035,514 B2 | 10/2011 | Brown | |
| 8,039,799 B2 | 10/2011 | Buckley | |
| 8,552,865 B2 | 10/2013 | Zhao | |
| 8,941,066 B2 | 1/2015 | Zhao | |
| 10,072,985 B2 | 9/2018 | Peterson | |
| 2002/0162963 A1 | 11/2002 | Lannestedt | |
| 2005/0200494 A1 | 9/2005 | Herrmann | |
| 2007/0253674 A1 | 11/2007 | Druckman | |
| 2017/0115164 A1 | 4/2017 | Peterson | |

* cited by examiner

FASTENERS FOR SECURITY DEVICES

CROSS-REFERENCE TO RELATED APPLICATION

The present application is a national phase entry under 35 U.S.C. § 371 of International Application No. PCT/GB2020/052646, filed Oct. 21, 2020, which designates the United States of America, which claims priority to GB Application No. 1915330.3, filed Oct. 23, 2019, the entire disclosures of each of these applications are hereby incorporated by reference in their entireties and for all purposes.

TECHNICAL FIELD OF THE INVENTION

The present invention relates to fasteners, in particular to improvements in fasteners in security devices, especially in sensors and most especially in passive infra-red motion detectors (known in the art as PIRs, which stands for Passive Infrared Receivers).

BACKGROUND TO THE INVENTION

Passive infra-red motion detectors are security devices used in alarm systems to detect movement, which can be indicative of an intruder, and relay a corresponding signal to a control panel, so as to trigger an alarm, for example.

Battery powered wireless passive infra-red motion detectors are known, which can be installed without wiring the detector to the power and/or the control panel, as are wired passive infra-red motion detectors. The present invention is relevant to both types.

Passive infra-red motion detectors for use in alarm systems are typically of two-part design, with a housing having a front section and a rear section. The rear section is attached to a wall or ceiling and the front section is removable from the rear section, e.g. for set-up or servicing.

The two parts are typically slid together to connect, or pivoted together to connect. A fastener is normally provided to hold the two parts together—in some examples, the fastener may be a simple screw, sometimes a captive screw held in one part; in other examples, a lock-type arrangement is provided, where the fastener can comprise the barrel of a lock, the barrel being accessible by a key, such as a simple screwdriver which can twist the barrel to undo a latch to allow the two parts to be disconnected, for example, removing a barrier to relative sliding, or removing a barrier to a push-clip disconnection.

Moving the two parts of the housing away from each other generally triggers a tamper-signal, for example triggered by a connector on one part disconnecting from a corresponding connector on the other part (especially in wired PIRs) or (more often for wireless PIRs) by movement causing a feature on one part to interact (or cease to interact) with a feature on the other, effectively opening or closing a switch.

In many designs, all the electronics of the device are provided on the rear section, with the front section merely a (normally plastic) cover, sometimes including a lens. In other designs, the electronics, or most of the electronics are provided in the front section, along with the optical system for the infrared sensor (normally a lens or mirrored optics). A benefit of this arrangement with electronics in the front is that the electronics can be provided in a casing, such that they are mechanically shielded by the housing at the front and the casing at the back, by shielding the electronics, they are not exposed when the PIR is installed and are less likely to be damaged. Also, in a wired arrangement, removal of the front section from the rear section can disconnect the electronics (on the front) from the wiring on the rear section and improving tamper-evidence (as the breaking of the connection can trigger a tamper signal). Moreover, where the electronics of the front section is updated, an updated front section can be replace the existing front section, by simply clipping in in place of the old front section, without the need to remove or re-wire the rear section.

A disadvantage of devices where the electronics is provided in the front section is that replacing the optical system can be more difficult. It is desirable for optical systems to be replaceable to provide for different functions, for example, an installer may choose from: a normal angle lens (for normal use); a long-distance lens (e.g. for looking down a corridor); a wide angle lens (e.g. for large open spaces); or a curtain-lens (to look across a window or the like, to detect intruders, without being triggered by movement inside or outside). Lenses, naturally, face forward from the front section, with sensors arranged behind them. Mirrored optics also face forward, with the sensor arranged to receive radiation reflected by the mirrored optics. The electronics can, therefore, be arranged behind the lens (although not, of course, so as to obstruct the sensor from its optical system).

Where the electronics is provided on the rear and the optical system on the front, the installer simply opens the housing to access the inside, then removes and replaces the lens from the back side of the front section (or removes mirrored optics from the front side of the rear section) On the other hand, where the electronics is provided in the front section, an installer first opens the housing, so as to access the inside, then opens the casing and removes the electronics (from the back side of the front section, often as a single action, with the casing carrying the electronics), then finally removes the optical system from the back side of the front section. In consequence, during replacement, the electronics are no longer shielded, and worse, they must normally be put down, separate from both the front section and the rear section, which increases the risk of damage whilst the optical system is replaced.

PIRs often have lights (typically LEDs) associated with them, which flash to indicate that they are active, triggered etc. These lights can be positioned behind the lens, so as to be visible (when lit) through the lens, which is normally translucent, but opaque to the eye in the absence of light from a LED, so that the electronic components behind the lens cannot be seen. Alternatively, lights may be provided behind separate transparent or tinted window/light guide to provide a more attractive display, for example more uniform light.

The present invention seeks to overcome or at least ameliorate one or more problems with the prior art and/or to provide an improved security device.

SUMMARY OF THE INVENTION

According to a first aspect of the invention, there is provided a security device comprising a housing and an optical system, wherein the optical system is removable from the outside of the housing.

The optical system may be a lens. The optical system may be mirrored optics.

Providing an optical system (e.g. a lens) which can be removed from the outside of the housing means that the optical system (e.g. a lens) can be replaced (or repaired) without the need to remove the electronics of the device (which may include a sensor, e.g. an infra-red sensor and/or a signal processor and/or a transmitter/receiver/transceiver/ relay) and which may be mounted behind the optical system (e.g. a lens) in a front section of the housing of the device.

This can make it easier for a manufacturer to stock-keep, allowing them to adapt a standard PIR module (i.e. the PIR without the lens) for use in particular circumstances, by making a standard module identical for many functions then changing the lens as appropriate, e.g. including a long-range optical system for a corridor or a wide area lens for other purposes.

Likewise, an installer can adapt a PIR by easily removing one optical system (e.g. a lens) from the PIR module and replacing it with a more appropriate optical system (e.g. a lens), without interfering with sensitive components on the inside. Thus user experience is improved, whilst and risk of damage or misconstruction is reduced.

The housing may comprise electronics (which may include a sensor, e.g. an infra-red sensor and/or a signal processor and/or a transmitter/receiver/transceiver/relay).

The housing may comprise a front section and a rear section. The optical system (e.g. a lens) may be removable from the front section of the housing. The electronics of the device may be mounted behind the optical system (e.g. a lens) in the front section of the housing of the device.

The electronics may be mounted in a casing. The optical system (e.g. lens) may be removable from the housing without removing the casing from the housing. In this way, the sensitive electronics can remain protected during removal/replacement of the optical system (e.g. lens)

The security device may comprise an optical-system-fastener such as a lens-fastener to fasten the optical system (e.g. lens) to the housing (e.g. to the front section of the housing), and which may be movable between fastened positions and unfastened positions to allow the lens to be removed (in the unfastened position).

The an optical-system-fastener such as a lens-fastener may be removable from outside the housing. The optical-system-fastener such as a lens-fastener may be removable from the front of the front section of the housing.

The an optical-system-fastener such as a lens-fastener may be arranged in a groove in the housing (e.g. in the front section of the housing).

The security device may be operable to trigger a tamper-signal in the event of unauthorised movement between the fastened and unfastened positions, or unauthorised removal of the optical system (e.g. the lens).

The front section and the rear section may be movable between an operational configuration and a non-operational configuration. For example, in the operational configuration the front and rear sections may be connected together and in the non-operational configuration the front and rear sections may be disconnected, or at least partially disconnected.

The security device may be operable to trigger a tamper signal in the event of unauthorised movement between the operational configuration and the non-operational configuration.

The security device may be configured such that the optical-system-fastener (e.g. lens-fastener) cannot be unfastened when the front section and rear section are in the operational configuration.

Counterintuitively, given the broader concept of allowing removal of the optical system (e.g. lens) from the outside of the housing, it is considered preferable that it cannot be removed without first removing the front section from the rear section (i.e. allowing access to the inside). This means that a further tamper signal for the optical-system-fastener such as a lens-fastener is not required, because a single tamper signal, associated with removal of the front section from the rear section would be activated before the optical-system-fastener could be unfastened.

Of course, this still makes it substantially easier to remove or replace the optical system, e.g. lens than the prior art where the electronics is provided on the front section, in which not only can the optical system only be removed from the inside (i.e. the back) of the front section, but removal would normally require disassembly and/or removal of all the features that are arranged behind the optical system, for example a casing, sensors, other electronics and so forth. Even if these can be removed without great difficulty, they are sensitive components which are not so well protected once removed.

In order that the optical-system-fastener such as a lens-fastener cannot be unfastened when the front section and rear section are in the operational configuration, the rear section may be provided with a locking feature arranged to interact with the optical-system-fastener to prevent movement of the optical-system-fastener from the fastened position to the unfastened position when the front section and the rear section are in the operational configuration.

For example, the optical-system-fastener, e.g. lens-fastener, may be rotatable between the fastened position and the unfastened position. In this case locking feature of the rear section may comprise a projection arranged to block rotation of the optical-system-fastener, e.g. lens-fastener, from the fastened position to the unfastened position, when the front and rear sections are in the operational configuration, but arranged to move to a position where rotation is not blocked when the front and rear sections are in the non-operational configuration.

The front section and/or the rear section may be tray-shaped, having a generally planar face with raised edges. The projection may extend inward from a raised edge.

The front section, for example the generally planar face thereof, may be provided with an aperture, behind, in, or through which the sensor is arranged. Other electronic components, such as a signal processor, and/or a transmitter/receiver/transceiver/relay may be arranged behind the generally planar face of the front section, optionally in a casing. The generally planar face of the front section may thereby separate the components from the lens and protect them when the lens is removed.

The optical-system-fastener, e.g. lens-fastener may be toroidal. The toroid may have a polygonal cross section, such as a rhomboid cross section. The optical system may be a part-spherical lens, e.g. comprising a spherical dome and may be provided with a flange, such as a radially outwardly extending flange. The optical-system-fastener may be arranged to extend around the part spherical lens and may be arranged to sandwich the flange against the housing, e.g. the front section of the housing. The optical-system-fastener may be arranged to sit in a groove, e.g. a toroidal groove in the housing (e.g. the front section of the housing). This can make unauthorised removal of the fastener (and hence the lens) more difficult.

The optical-system-fastener, e.g. lens-fastener may comprise one or more legs arranged to extend through an aperture in the front section e.g. the planar face thereof. One or more or each leg may be provided with a foot arranged to secure the optical-system-fastener, e.g. lens-fastener in place. The foot may be movable between a fastened position in which it cannot be pulled through the aperture and an unfastened position in which it can be pushed/pulled through the aperture.

The locking feature of the rear section may block movement of one or more or each foot from the fastened position to the unfastened position when the front and rear sections of the housing are in the operational configuration. The locking feature of the rear section may allow movement of one or more or each foot from the fastened position to the unfastened position when the front and rear sections of the housing are in the non-operational configuration.

The flange may be provided with one or more cut-outs or openings through which one or more or each leg can extend.

The invention may further comprise a kit of parts according to the first aspect of the invention (and optionally any optional features), including a housing and an optical system (e.g. a lens) and further comprising a further, second, optical system (e.g. lens), which can replace the first optical system. The further, second, optical system (e.g. lens) may have different properties from that of the first optical system (e.g. lens). Accordingly, an installer can choose the most appropriate optical system for the job at hand and install it (simply).

The optical-system-fastener, e.g. lens fastener may be at least partially transparent or translucent and form a light guide.

According to a second aspect of the invention, there is provided a security device comprising a housing and a fastener, wherein the fastener is at least partially transparent or translucent and forms a light guide.

Forming a fastener which is at least partially transparent or translucent and operates as a light guide can improve user experience, achieve the advantages in terms of an improved appearance of the light that is normally obtained by use of a separate tinted window or light guide, without requiring the additional cost or complexity of that additional component, or the extra space such a component requires in an ideally compact/slimline device. It can also allow for different patterns of light from those currently known.

The fastener (or the/a part thereof which is transparent or translucent and forms a light guide) may be tinted. Tinting can hide the light source that is behind the fastener, improving the appearance when unlit.

The fastener (or the/a part thereof which is transparent or translucent and forms a light guide) may extend from an interior cavity of a housing of the security device to the exterior of the housing.

The light guide may have a light receiving surface and a light emitting surface. The light receiving surface may be arranged facing a light source in the interior cavity of the housing or in an aperture through the housing. The light emitting surface may be provided at the exterior of the housing.

The light emitting surface may be larger than the light receiving surface and/or larger than a light-emitting surface of a light (such as an LED) that provides light to the light emitting surface, so as to emit light from a larger area. This can soften the light, can make it visible from more angles and/or can simply provide for a more attractive light-output.

The housing may have a front and a rear; it may have a top and a bottom; it may have sides. The light emitting surface may be at the front of the housing (e.g. where the housing is for attachment to a wall, at the face furthest from the wall, or where the housing is for attachment to a ceiling at the face furthest from the ceiling). The light emitting surface may be at the bottom of the housing (e.g. where the housing is for attachment to a wall, the face which is intended to face downwards).

Those skilled in the art will appreciate that security devices, and PIRs in particular, are normally intended to be disposed in a particular orientation to fulfil their function (e.g. sensing movement in a room). The light emitting surface could be on a side, but this is considered less desirable, both from the point of view of aesthetics, e.g. in terms of symmetry of the device and in terms of the most suitable position for a fastener.

The fasteners normally used to secure the front section of a housing to the rear section are normally provided at the bottom, as this is the surface most easily accessed when the device is mounted to the wall (normally close to the ceiling and often in a corner). However, as will be apparent from the disclosure above, the present invention also contemplates providing a fastener at the front of a housing.

The fastener may be a fastener arranged to fasten a front section of the housing to a rear section of the housing.

The security device may comprise an optical system, e.g. a lens or mirrored optics, and the fastener may be an optical-system-fastener, e.g. a lens-fastener arranged to fasten the optical system (e.g. lens) to the housing. The optical-system-fastener, e.g. lens-fastener may be arranged to fasten the optical system (e.g. lens) to the front section of the housing, and/or it may be movable between fastened positions and unfastened positions to allow the optical system (e.g. lens) to be removed (in the unfastened position).

The fastener may be an optical-system-fastener, e.g. lens-fastener according to a first aspect of the invention (optionally including any optional features) and/or the security device may be a security device according to the first aspect of the invention (optionally including any optional features).

Optional features of first aspect of the invention may be provided in the security device of the second aspect of the invention without necessarily including the required features of the first aspect, and vice versa, optional features of second aspect of the invention may be provided in the security device of the first aspect of the invention without necessarily including the required features of the second aspect.

In particular in a security device according to the second aspect of the invention which is also in accordance with the first aspect of the invention and comprises a lens having a flange, the flange may be provided with an opening or cut-out to allow light emitted by a light source in the device to be received by a light receiving surface of the lens-fastener and emitted from a light emitting surface of the lens-fastener.

In either aspect of the invention, the security device may be a sensor, in particular, it may be a passive infra-red motion detector. Alternatively, it could for example be another type of electronic security device, for example, other types of sensor; a communicator; a network expander; a power supply; or control and indicating equipment.

DETAILED DESCRIPTION OF THE INVENTION

In order that the invention may be more clearly understood one or more embodiments thereof will now be described, by way of example only, with reference to the accompanying drawings, of which.

Referring to the figures, a security device in the form of a wired passive infra-red motion detector (hereafter a "PIR") 1 is illustrated. The PIR 1 is of two-part construction formed from a housing having a front section 2 and a rear section 3 (e.g. by injection moulding a plastics material). The PIR comprises an optical system in the form of a lens 4 facing forward from the front of the front section 2 of the housing.

Figure 4:
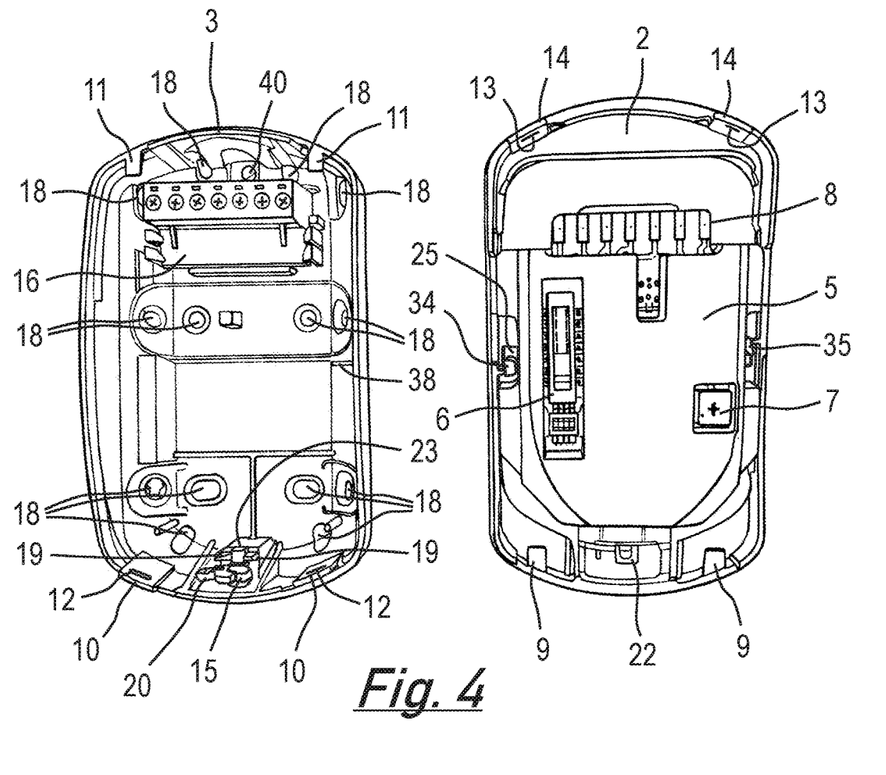
FIG. 4 shows a plan view of the inside of two halves the passive infra-red motion detector of FIGS. 1-3 in its open state, looking from front to back at the rear section and from back to front at the front section.
Figure 7:
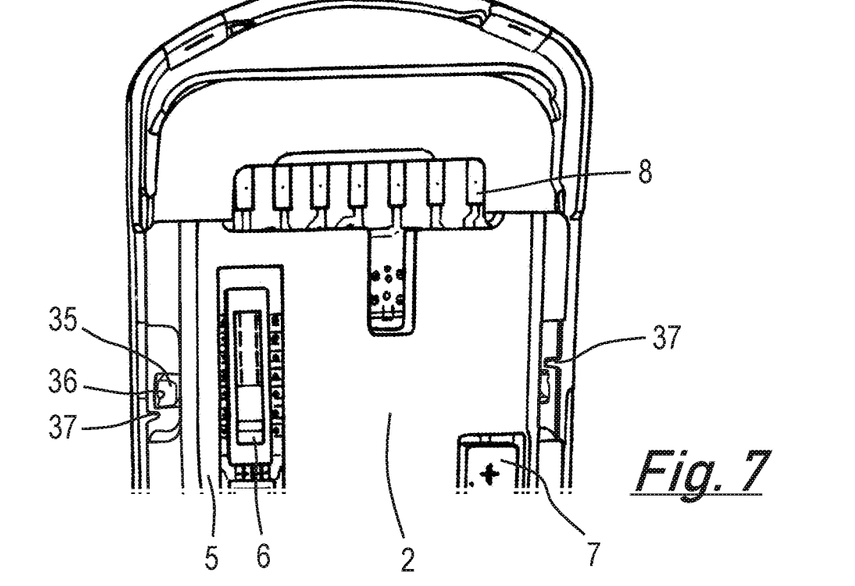
FIG. 7 shows a close-up plan view of the inside of the front section of the passive infra-red motion detector of FIGS. 1-6 with the lens-fastener in an unfastened condition
Figure 8:
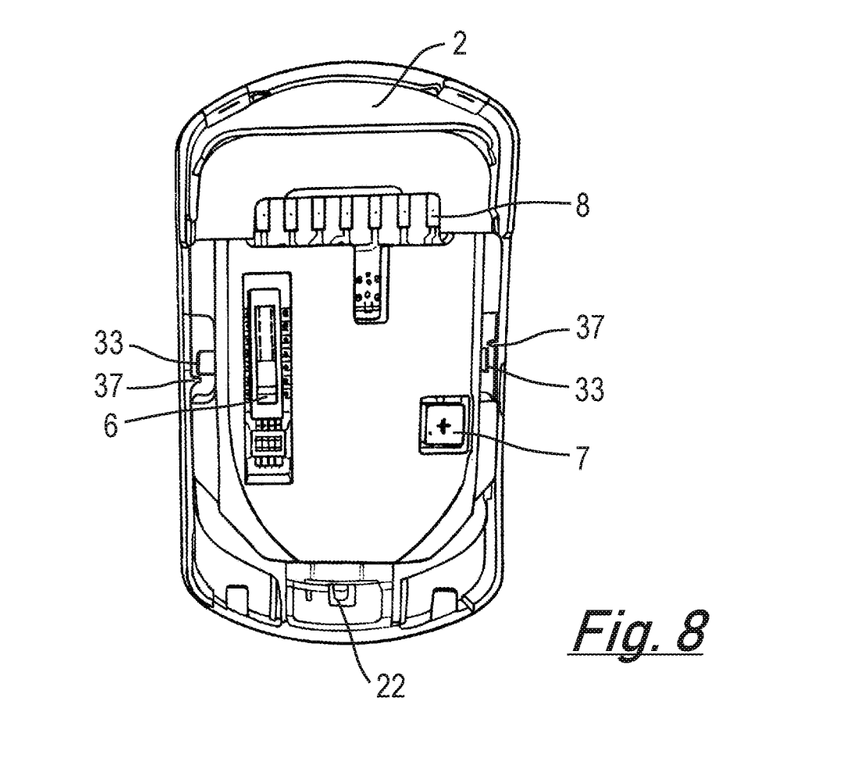
FIG. 8 shows a plan view of the inside of the front section of the passive infra-red motion detector of FIGS. 1-7 with the lens-fastener in an unfastened condition
Figure 11:
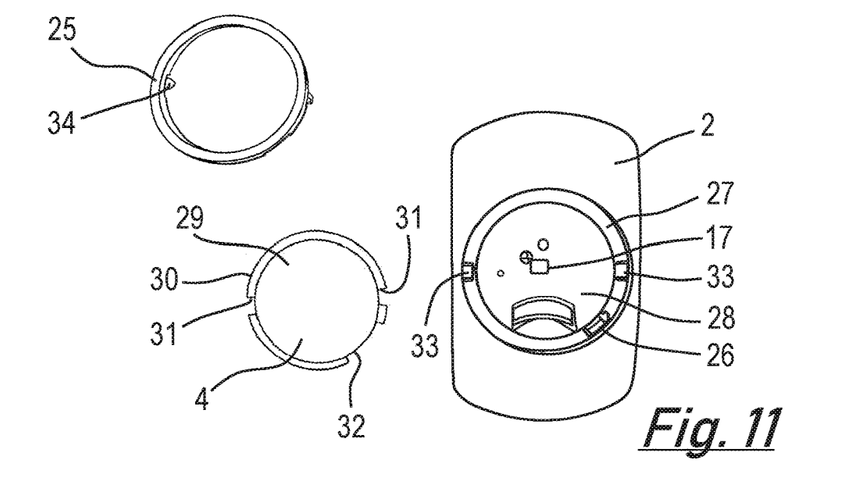
FIG. 11 shows a plan view of the front section of the passive infra-red motion detector of FIGS. 1-10 with the lens-fastener and the lens removed and also shown in plan view.

As shown in FIGS. 4, 7 and 8, a casing 5 is provided internally, i.e. at the back of the front section 2 of the housing, encasing electronics, including an infra-red sensor 17, visible in FIG. 11, a signal processor (not shown) and a transceiver (not shown). Certain parts of the electronics extend through the casing so as to be accessible from the inside when the housing is open, such as adjusters 6, 7, and, from the top of the casing, extending upwards, a connector 8.

In this embodiment, the front and rear sections 2, 3 of the housing are both of generally rectangular tray-shaped form, with a generally planar face having raised edges at both the long sides and shorter ends. The PIR 1 is intended, normally, to be mounted with its long sides vertical, a top end at the top and a bottom end at the bottom—in the orientation shown in FIGS. 1 and 2. As shown in FIGS. 2 and 4, various holes (or regions in which an installer can form holes) 18 are provided through the rear section 3, so that it can be attached to a wall by conventional means (e.g. screw fasteners extending from the interior of the housing through the rear section 3 into the wall). However, it is to be understood that this generally rectangular form is not essential and that the PIR 1 could work in other orientations.

The raised edges of the front section 2 abut the raised edges of the rear section 3 when assembled, defining a cavity within. To connect the front section 2 to the rear section 3, as shown in FIG. 4, the front section is provided with two tabs 9 extending upwardly in-use into the cavity from the rim of the edge at the bottom end; the two tabs 9 are arranged to co-operate with, a pair of corresponding apertures 12 in projections 10, which extend forward/outward in-use, the tabs 9 extending up through the apertures in the projections 10, in use.

Similarly, the rim of the edge at the top end of the rear section 3 is provided with two tabs 11, which extend downward in-use, into the cavity. These tabs 11 co-operate in a similar fashion with apertures 13 provided in projections 14, which extend rearward in-use. In consequence, the two sections 2, 3 of the housing can be attached together, and brought from a non-operational configuration to an operational configuration, by a sliding connection, with the front section 2 placed slightly out of registration with the rear section 3, below it, then slid up into registration with the rear section 3; the projections 9 of the front section 2 entering the apertures 12 of the rear section, and the projections 11 of the rear section 3 entering the apertures 13 of the front section.

As shown in FIG. 4, terminal block 16 is mounted in the rear section 3, near its top end. In view of the sliding connection of this embodiment, the terminal block 16 is provided with a connector having an opening, which in a use-configuration faces downward, so as to receive the upwardly extending connector 8 of the front section 2, when the two sections are slid into attachment. Accordingly, detaching the front section 2 from the rear section 3 (moving it from the operational condition to the non-operational condition) disconnects the electronics from the terminal block 16. Since in use the terminal block will be wired to a control panel (not shown) of an alarm system, this disconnection can be detected from a loss of signal and appropriate action can be taken e.g. the alarm may be triggered or a fault signal emitted to indicate apparent tampering with the PIR 1.

Figure 3:
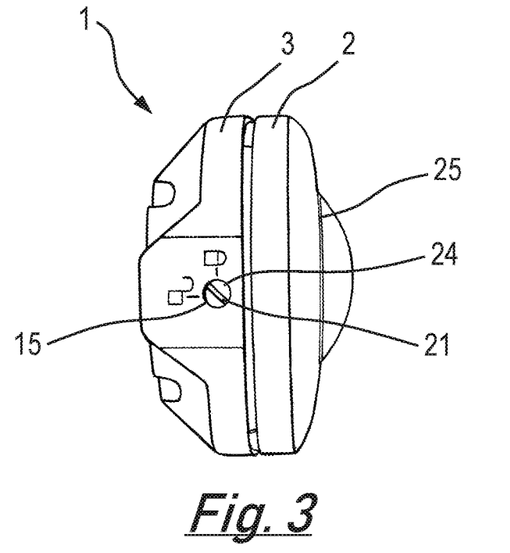
FIG. 3 shows an underneath view of the inside of the passive infra-red motion detector of FIGS. 1-2.
Figure 13:
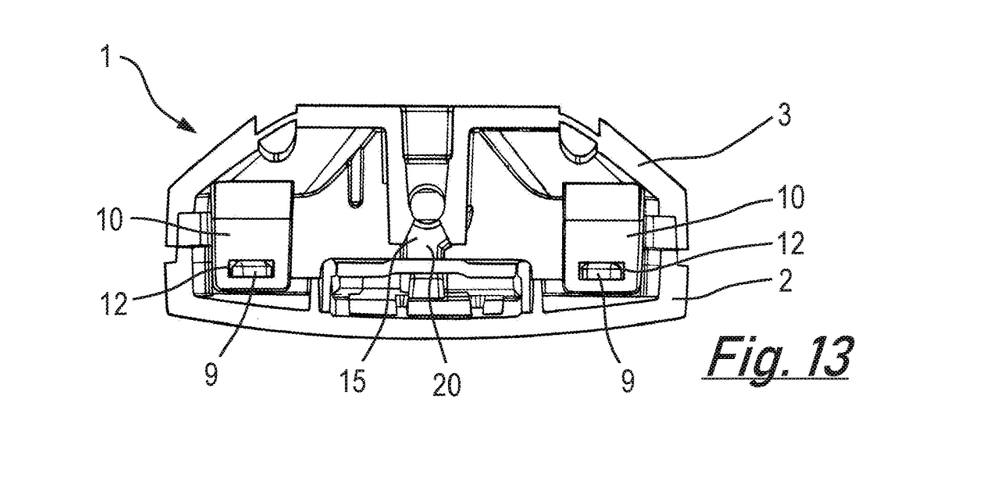
FIG. 13 shows a cross section through the passive infra red detector of FIGS. 1-12 near the bottom looking upwards.

A housing-fastener 15, best seen in FIGS. 3,4 and 13, is provided at the bottom of the rear section 3. The housing-fastener 15 has a barrel which extends through an aperture in the base of the rear section 3 and is clipped in position by clips 19, which allow it to rotate in the longitudinal axis (i.e. the axis from top to bottom in-use). The housing fastener 15 includes a latching finger 20, which is integrally formed, extending laterally from the barrel and movable between a latched position shown in FIG. 13 and an unlatched position shown in FIG. 4.

Movement between the latched and unlatched positions is achieved by rotating the fastener 15, in this case using a flat-blade screwdriver introduced into a slot 21 in the base of the fastener, visible in FIG. 3 and accessed from below the PIR 1.

When the finger 20 is in the latched position of FIG. 13, it extends forward, i.e. from the rear section 3 towards the generally planar front face of the front section 2. A co-operating stop 22 is provided on the front section 2, projecting from the generally planar front face which abuts the top of the finger 20 to prevent the front section 2 from being slid downward relative to the rear section 3, and thereby detached.

Rotating the finger 20 to the unlatched position of FIG. 4 leads it to extend laterally, such that it does not interfere with the stop 22 on the front section 2, so as to allow the sections 2, 3 to be slid apart for access.

The entirety of the housing-fastener 15 is transparent. Accordingly, the barrel of the fastener 15 (which extends from inside the cavity to outside it) can act as a light guide to allow light from an LED (not shown) to be received by an upper, light receiving, surface 23 and emitted from the lower, light emitting, surface 24. In consequence, the housing-fastener 15 serves a dual purpose, both securing the housing and providing a means of emitting light. The properties of the fastener, e.g. in terms of tinting, frosting and so forth can be adjusted as desired to provide a emission for example of diffuse light, having a particular colour or uniformity across the entire light emitting surface 24 of the housing-fastener 15, in a manner that cannot be achieved when emitting light through the lens of a PIR, and which heretofore required an entirely separate window/light guide provided in a separate bespoke aperture formed in the housing.

The PIR 1 comprises a further fastener, in the form of an optical-system-fastener or lens-fastener 25, best seen in FIGS. 1 and 9-12. The lens-fastener 25 is, like the housing fastener 15, transparent or translucent, so as to act as a light guide to allow light from an LED 26 (visible in FIGS. 11 and 12) arranged in an aperture through the generally planar surface of the front section 1 of the housing to be emitted through the lens-fastener 25.

Figure 9:
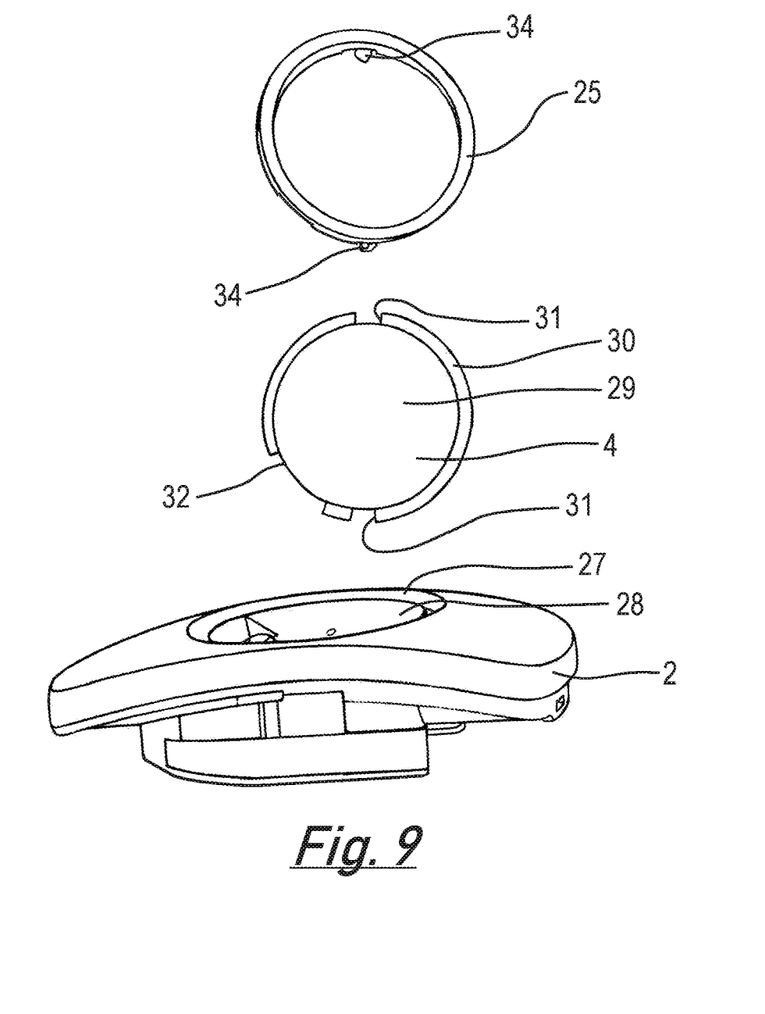
FIG. 9 shows a side view of the front section of the passive infra-red motion detector of FIGS. 1-8 with the lens-fastener and the lens removed and shown in plan view.
Figure 12:
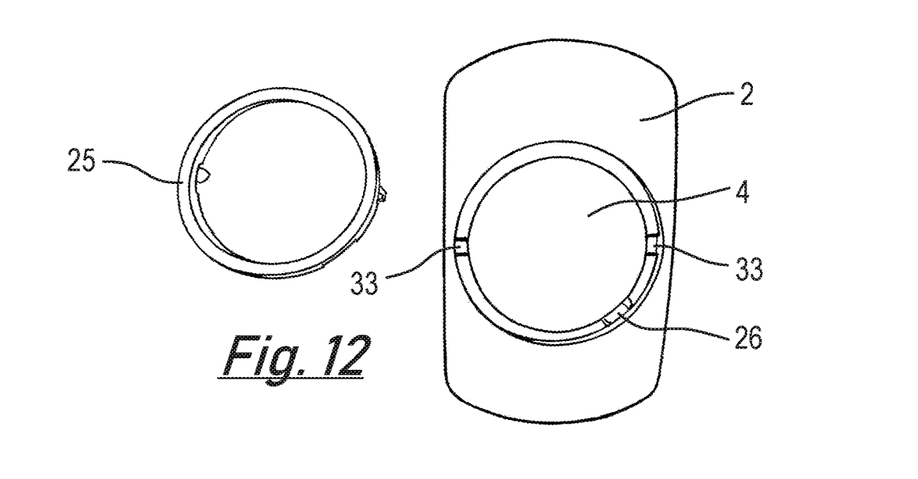
FIG. 12 shows a plan view of the front section of the passive infra-red motion detector of FIGS. 1-11 with the lens in place, but the lens-fastener removed and also shown in plan view.

In more detail, and as best illustrated by FIGS. 11 and 12, the generally planar surface of the front section of the PIR 1, is broadly rectangular, but with outwardly bulging rounded top and bottom ends; it is convex, curving outwards, forwards from its sides and ends (as best shown in FIG. 2), and as best seen in FIGS. 9 and 11 has a toroidal groove 27 set into the generally planar (convex) surface. Radially inwardly of the toroidal groove 27, the generally planar surface is provided with a concave bowl-like section 28. It is through this bowl section 28 that the sensor 17 extends (with other electronics being inaccessible from the front, arranged behind the convex, concave or grooved regions of the front section 2 and thus protected).

The lens 4 is part-spherical, specifically, shaped as a spherical dome 29 with a radially outwardly extending flange 30. The flange 30 is shaped and configured to sit in the toroidal groove 27, with the spherical dome extending forward, outwardly therefrom.

Still referring to FIGS. 9 and 11, the flange 30 is provided with an opening 32 arranged to align with the location of the LED 26, which extends through the front section 2 in the region of the toroidal groove 27 (in this embodiment in the lower right-hand side of the groove), so as not to block light emitted from the LED. Additionally, two diametrically opposed cut-outs 31 are provided in the flange, arranged in this embodiment to coincide with the left- and right-hand extremities of the toroidal groove 27, when the opening 32 is aligned with the LED.

The front-section 2 of the PIR is provided with a pair of corresponding apertures 33, in this embodiment of square cross-section, which extend through front section in the same position as the cut-outs 31. These apertures 33 are arranged to receive legs 34 of the lens-fastener 25. The lens-fastener 25 has a generally toroidal shape with a rhomboid cross section, with a planar rear edge (intended to fit flush against the front of the flange 30), parallel inner and outer edges, extending perpendicular from the rear edge, and an angled front edge, such that the inner periphery of the front edge is arranged rearward of the outer periphery. The legs 34 extend rearward from the rear edge.

With the legs 34 extending through the apertures 33 in the front section 2, the body of the lens-fastener 25 extends around the spherical dome 29 of the lens 4, sandwiching flange 30 against the housing and thereby attaching the lens to the front of the PIR. Each leg 34 is provided with a foot 35 to secure the lens-fastener 25 in place. The feet 35 of this embodiment extend clockwise when the lens-fastener 25 is in position, such that twisting the lens-fastener 25 clockwise brings the feet into location behind the generally planar surface of the front section 2, whereas twisting the lens-fastener 25 anti-clockwise brings them into alignment with the apertures 33, so that the lens-fastener 25, and then the lens 4 can be pulled off the front of the PIR 1.

Figure 5:
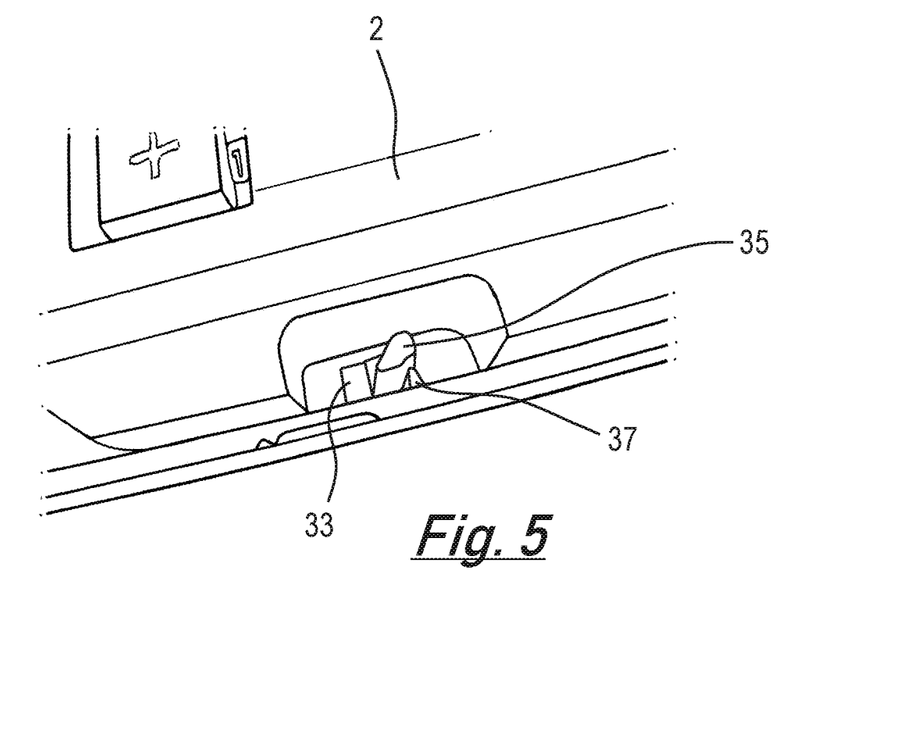
FIG. 5 shows a close-up detailed view of the inside of the front section of the passive infra-red motion detector of FIGS. 1-4 in the region of a leg of a lens-fastener which is in the fastened condition.

Thus, when the lens-fastener 25 is rotated into its fastened position, one leg 34 moves upward and one leg 34 moves downward. As can be seen from FIGS. 4, 5, 7 and 8, to maintain the legs 34 in their fastened positions (of FIGS. 4 and 5), the feet 35 are provided with recesses 36 (best seen in FIG. 7) in their radially outer sides, which recesses 36 align with and receive the tips of a pair of retaining projections 37, extending radially inwards from the inside of the raised edges of the front section 2 to maintain the lens-fastener 35 in its fastened position, unless a predetermined amount of force is applied when rotating the lens-fastener 25. Rotation is of course easiest by pushing the legs, since grasping the lens-fastener 25 from the front would be difficult as is set into the groove 27. Thus, although the lens is removable from outside the housing (and, importantly, without removing the electronics), access to the interior is necessary in order to rotate the legs to the unfastened position (of FIGS. 7 and 8).

Figure 6:
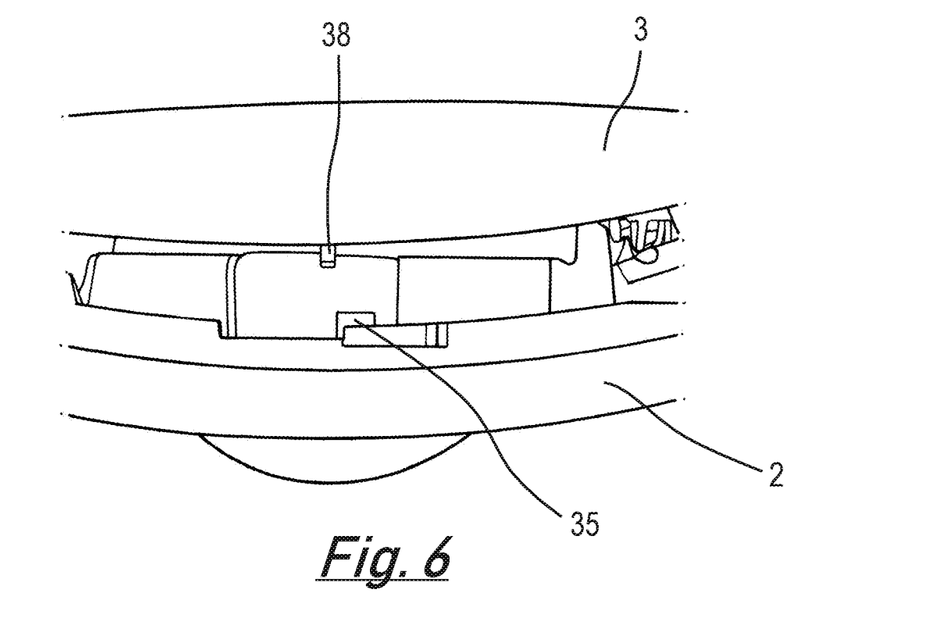
FIG. 6 shows a close-up side view of the passive infra-red motion detector of FIGS. 1-5 in the non-operational condition and in the region of the lens-fastener and a locking feature of the rear section.

Additionally, to maintain the lens-fastener 25 in the fastened position when the PIR is in its operational condition, the rear section 3 is provided with a locking projection 38 (see FIGS. 4 and 6) which extends radially inwardly from one raised edge of the tray-shaped rear section 3 and forward therefrom. The projection 38 is carefully arranged, such that when the lens-fastener 25 is in the fastened position, bringing the front section 2 into the operational configuration, by sliding it upwardly in relation to the rear section 3, brings the locking projection 38 into abutment with the top of the leg 34 that moved downward when rotated to the fastened position, stopping it from being rotated upward when the front and rear sections 2, 3 are connected.

(Obviously when the housing is moved to the non-operational configuration, the locking projection 38 ceases to block rotation of the leg 34 and the fastener as a whole.)

In consequence, although the lens 4 is removable from the front, it cannot be removed without opening the housing, which, as discussed above, disconnects the connector 8 of the front section from the terminal block 16 of the rear section 3, and can thereby trigger a fault/tamper signal, revealing any attempt to tamper with the lens 4, e.g. by replacing it.

Of course, it is intended that the lens can be replaced by authorised professionals, for example to fit improved lenses for particular applications, or in the event of damage to a lens, in this case the alarm system will be disabled by means well known in the art.

Figure 10:
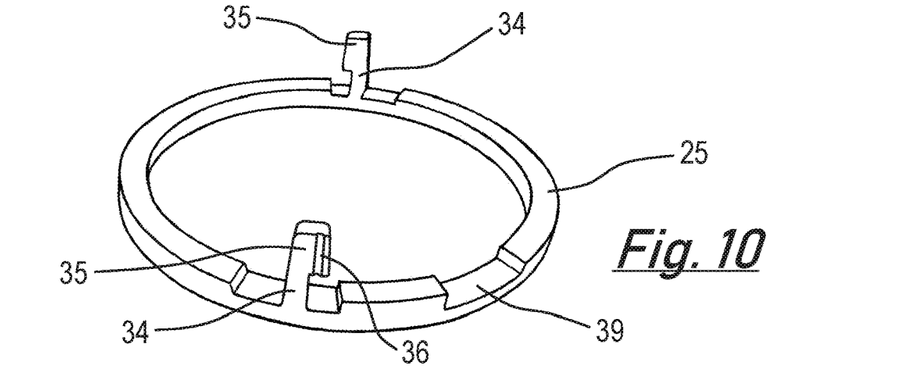
FIG. 10 shows a close-up perspective underside view of the lens-fastener of FIGS. 1-9.

Returning to the detail of the lens-fastener 25, as shown in FIG. 10, it is selectively thinned, or scalloped, at the back in the region of the two legs 34, to provide a degree of flexibility/resilience, so that the legs 34 can be pushed all the way through the apertures 33 in the front section 2, then spring back to a flat configuration, once the feet 35 are engaged with the inside of the front section 2. The lens-fastener 25 also has a scallop 39 arranged facing the LED 26. This means that light is received not only on the back face of the scalloped section, but also on its sides, helping light to be distributed around the entire light guide 25, so as to be emitted uniformly from its front, light emitting, surface. Of course, various known means of improving light distribution may be used, such as the provision of grooves and facets around the light guiding lens-fastener 25.

To assemble and install the PIR 1, an installer locates the location where the PIR 1 is to be installed, typically the corner of a room, to which a cable with all the necessary wires has been run from a security alarm control panel (not shown). If the PIR 1 has been supplied with the front section 2 and rear section 3 attached, the installer detaches the front section 2 from the rear section 3 of the housing of the PIR 1 and selects which apertures 18 that are to be used to mount the PIR, then marks the wall (not shown) and introduces suitable fastenings into the wall (e.g. wall plugs), optionally first drilling holes in line with the marks. A cable (not shown) is then threaded through the central top hole 40 and wired into the terminal block 16. Screws (not shown) are introduced through the selected holes 18 to attach the rear section 3 of the housing to the wall.

If the lens 4 has been supplied separate from the front section 2, as shown in FIGS. 9 and 11, the installer places the lens 4 onto the front section 2 as shown in FIG. 12, with the opening 32 aligned with the LED 26 and the cut-outs 31 aligned with the apertures 33 in the front section. The lens-fastener 25 is then oriented such that its legs 34 face backward (as shown in FIG. 12), the legs 34 are brought into registration with the apertures 33, whilst the light-receiving scallop 39 is brought into registration with the LED 26 and the legs 34 are pushed into the holes 33 (as shown in FIG. 8), until the feet 35 extend right through (as shown in FIG. 7), then rotated clockwise until the feet 35 sit behind the generally planar surface of the front section 2, retained by the retaining projections 37 with the flange 30 of the lens 4 sandwiched between the lens-fastener 25 and the front section 2, and held in the groove 27.

Figure 1:
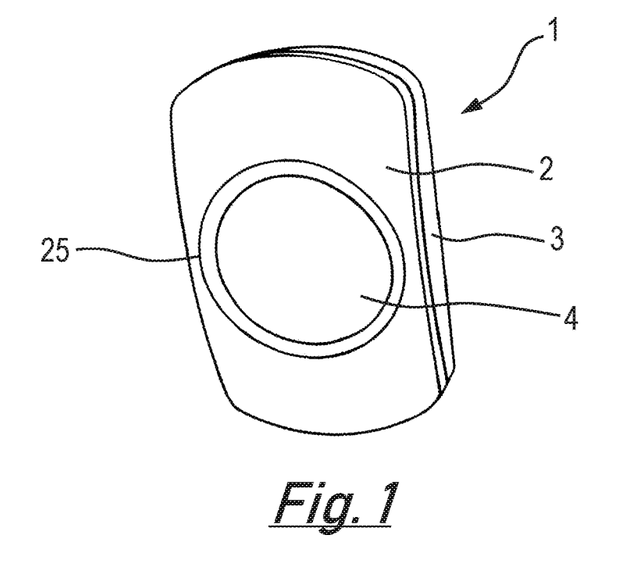
FIG. 1 shows a front-perspective view of a passive infra-red motion detector according to the invention.
Figure 2:
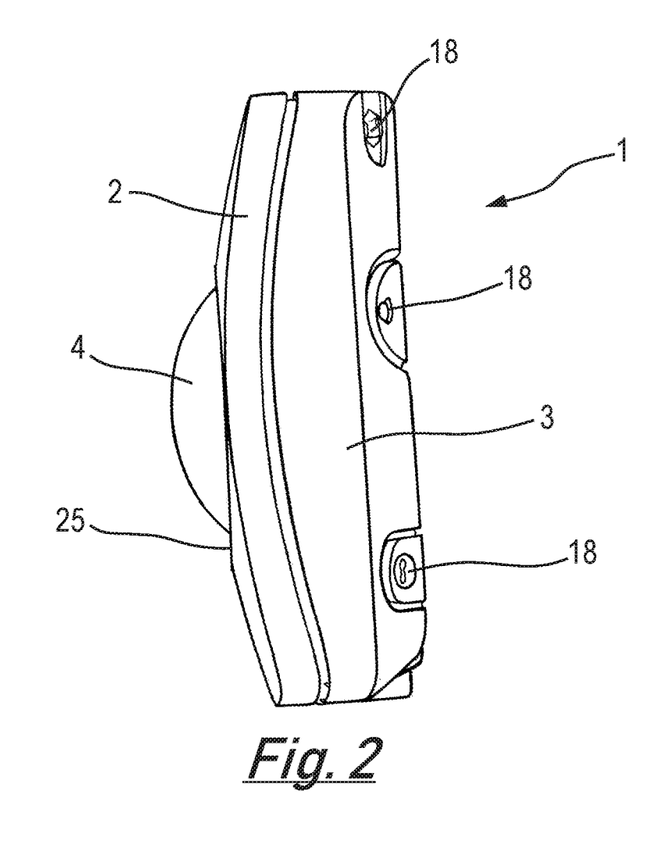
FIG. 2 shows a side view of the passive infra-red motion detector of FIG. 1.

Having made any necessary adjustments/settings using the adjusters 6, 7 on the front section 2, the front section 2 is then located with its back facing the front of the rear section 3 and disposed slightly out of registration with the rear section 3, downwards thereof, the slid upwards such that the connector 8 of the front section 2 enters the opening of the terminal block 16 in the rear section 3 and respective projections 9, 11 enter respective apertures 12, 13, until the front section and rear section 3 are in registration, as shown in FIG. 1. The housing fastener 15 is then turned (by a screwdriver introduced into the slot 21) to bring the latching finger 20 into the latched position of FIG. 13 to maintain the closed state.

The alarm system can then be switched on, and light from the LED 26 will be emitted uniformly around the lens 4 via the lens fastener, with light from another LED (not shown) emitted from the housing-fastener 15.

In the event that it is necessary for an authorised person to change the lens 4, the alarm system will be disabled by the appropriate action, e.g. at a control panel (not shown), in order that the alarm is not triggered by a tamper-signal when the two parts 2, 3 of the housing are taken apart. The housing fastener 15 is then twisted to the unlatched position (of FIG. 4), then the front section 2 is slid down with respect to the rear section 3 (from the operational position to a non-operational position) and removed therefrom. The lens fastener 25 is then turned anticlockwise (when viewed from the front) to bring the feet 35 into registration with the apertures 33, pushed or pulled through the apertures 33 and off the lens 4, so as to allow a replacement lens to be introduced in its place, before following the sequence outlined above to fasten the lens 4 in place and return the PIR 1 to its operational configuration.

It will be appreciated that this PIR offers various improvements over the prior art, primarily that the fasteners 15, 25 act as light guides improving the appearance of light emitted whilst serving a dual purpose, so not increasing cost (at least not substantially) and that the lens 4 can be removed easily, from the front, without disturbing any of the electronic components housed behind it.

The one or more embodiments are described above by way of example only. Many variations are possible without departing from the scope of protection afforded by the appended claims.

Just as one example, the invention is by no means limited to use with wired PIRs, but could equally be used with wireless PIRs, although an alternative approach to detecting movement to the non-operational configuration would be required (those skilled in the art will have no difficulty devising such tamper-indicating systems). As another example, the fasteners need not be entirely transparent/translucent.

The invention claimed is:

1. A security device comprising a housing and an optical system, wherein the optical system is removable from the outside of the housing, wherein the housing comprises a front section and a rear section and the optical system is removable from the front section of the housing, wherein the front section and the rear section are movable between an operational configuration and a non-operational configuration, and wherein the security device is operable to trigger a tamper signal in the event of unauthorised movement between the operational configuration and the non-operational configuration.

2. A security device according to claim 1 wherein the optical system is a lens.

3. A security device according to claim 2 wherein the lens comprises a spherical dome and a radially outwardly extending flange; and wherein the lens-fastener is arranged to extend around the spherical dome and to sandwich the flange against the housing.

4. A security device according to claim 1 comprising an optical-system-fastener to fasten the optical system to the housing, and which is movable between fastened positions and unfastened positions to allow the optical system to be removed in the unfastened position.

5. A security device according to claim 1 wherein electronics of the device, comprising an infra-red sensor, a signal processor and one or more of a transmitter, a receiver, a relay or a transceiver are mounted in the front section of the housing of the device.

6. A security device according to claim 5 wherein the electronics is mounted in a casing and wherein the optical system is removable from the housing without removing the casing from the housing.

7. A security device according to claim 5 wherein the front section and the rear section are tray-shaped, having a generally planar face with raised edges, and wherein the generally planar face of the front section is provided with an aperture, behind, in, or through which the sensor is arranged; and wherein a signal processor, and one or more of a transmitter, a receiver, a relay or a transceiver are arranged behind the generally planar face of the front section.

8. A security device according to claim 1 wherein the optical-system-fastener cannot be unfastened when the front section and rear section are in the operational configuration.

9. A security device according to claim 8 wherein, in order that the optical-system-fastener cannot be unfastened when the front section and rear section are in the operational configuration, the rear section is provided with a locking feature arranged to interact with the optical-system-fastener to prevent movement of the optical-system-fastener from the fastened position to the unfastened position when the front section and the rear section are in the operational configuration.

10. A security device according to claim 9 comprising an optical-system-fastener to fasten the optical system to the housing, and which is rotatable between fastened positions and unfastened positions to allow the optical system to be removed in the unfastened position, wherein the locking feature of the rear section comprises a projection arranged to block rotation of the optical-system-fastener from the fastened position to the unfastened position, when the front and rear sections are in the operational configuration, but arranged to move to a position where rotation is not blocked when the front and rear sections are in the non-operational configuration.

11. A security device according to claim 9 wherein the optical-system-fastener comprises one or more legs arranged to extend through an aperture in the/a front section of the housing, one or more or each leg being provided with a foot arranged to secure the fastener in place and movable between a fastened position in which it cannot be pulled through the aperture and an unfastened position in which it can be pushed/pulled through the aperture wherein the locking feature of the rear section blocks movement of one or more or each foot from the fastened position to the unfastened position when the front and rear sections of the housing are in the operational configuration and allows movement of one or more or each foot from the fastened position to the unfastened position when the front and rear sections of the housing are in the non-operational configuration.

12. A security device comprising:
a housing;
an optical system, wherein the optical system is removable from outside of the housing; and
an optical-system-fastener to fasten the optical system to the housing, wherein the optical-system-fastener is movable between fastened positions and unfastened positions to allow the optical system to be removed in the unfastened position,
wherein the optical system is a lens, wherein the optical-system-fastener is a toroidal lens fastener, and wherein the optical-system-fastener comprises one or more legs arranged to extend through an aperture in the/a front section of the housing, one or more or each leg being provided with a foot arranged to secure the fastener in place and movable between a fastened position in which it cannot be pulled through the aperture and an unfastened position in which it can be pushed/pulled through the aperture.

13. A security device comprising a housing and a fastener, wherein the fastener is at least partially transparent or translucent and forms a light guide, wherein the fastener or the/a part thereof which is transparent or translucent and forms a light guide is tinted.

14. A security device according to claim 13 wherein the light guide extends from an interior cavity of the housing of the security device to the exterior of the housing; wherein the light guide has a light receiving surface and a light emitting surface, the light receiving surface arranged facing a light source in the interior cavity of the housing or in an aperture through the housing and the light emitting surface provided at the exterior of the housing.

15. A security device according to claim 14 wherein the light emitting surface is larger than the light receiving surface and/or larger than a light-emitting surface of a light that provides light to the light emitting surface.

16. A security device according to claim 13 wherein the fastener which is at least partially transparent or translucent and forms a light guide is arranged to fasten a front section of the housing to a rear section of the housing.

17. A security device according to claim 13 comprising a lens, wherein the fastener which is at least partially transparent or translucent and forms a light guide is a lens-fastener arranged to fasten the lens to the housing, and which is movable between fastened positions and unfastened positions to allow the lens to be removed in the unfastened position.

* * * * *